Oct. 5, 1937.  W. E. FORMWAY  2,094,880
WALNUT HULLER
Filed Oct. 11, 1935   2 Sheets-Sheet 2
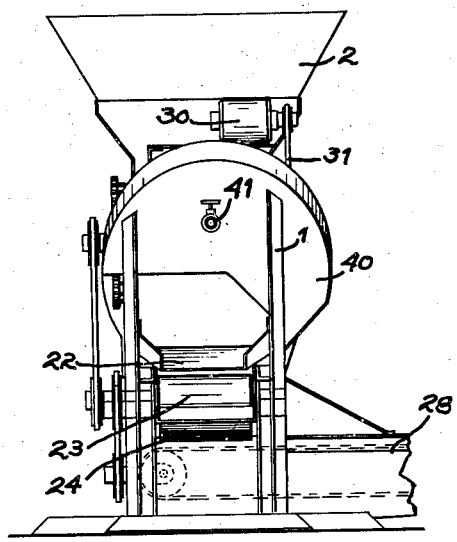
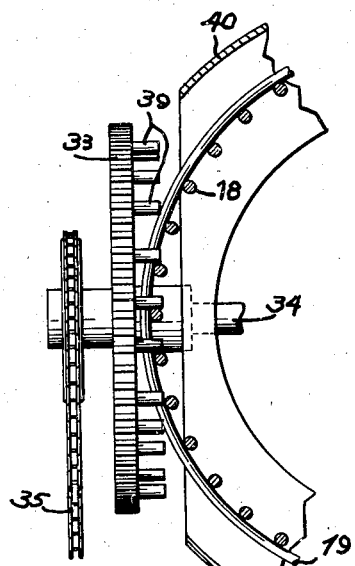
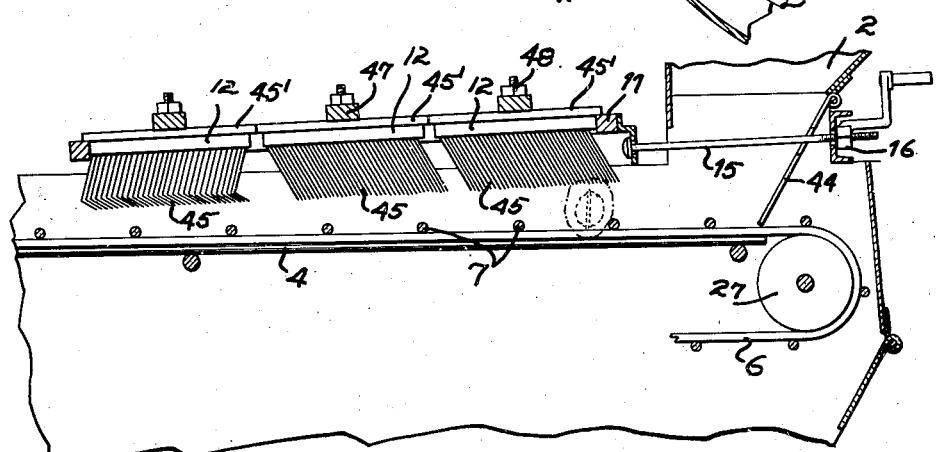
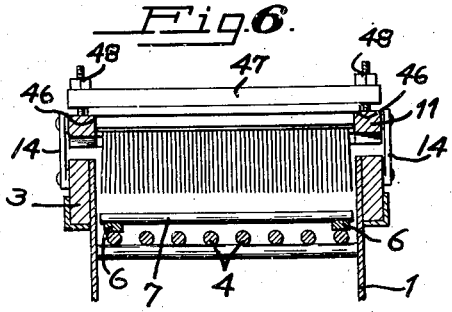
INVENTOR,
WILLIAM E. FORMWAY
BY Lippincott & Metcalf
ATTORNEYS Patented Oct. 5, 1937

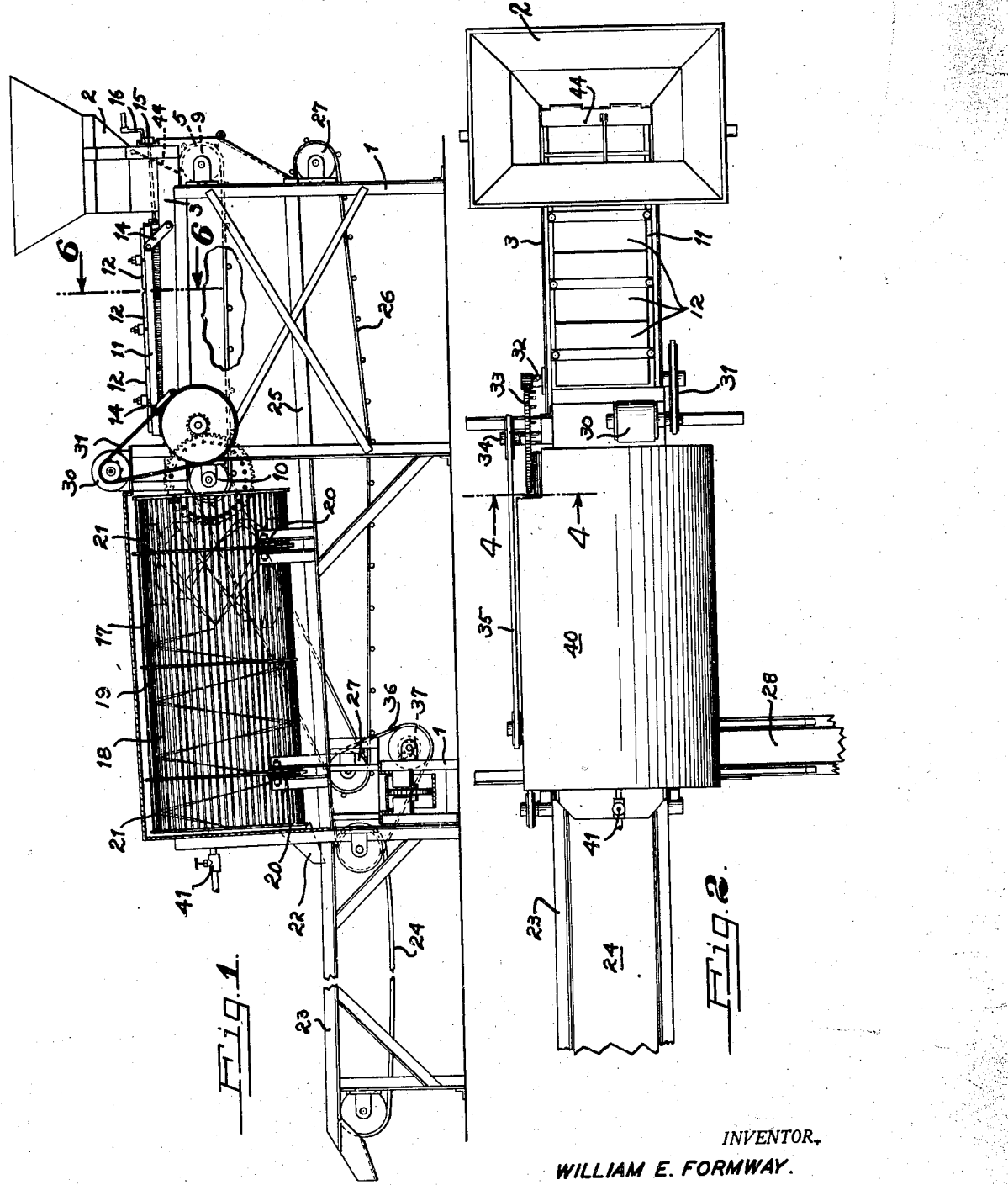

2,094,880

UNITED STATES PATENT OFFICE 2,094,880

WALNUT HULLER

William E. Formway, Los Altos, Calif.

Application October 11, 1935, Serial No. 44,530

1 Claim. (Cl. 146—8)

My invention relates to walnut hullers, and more particularly to a machine adapted to hull, wash, and separate the hulls from the clean nuts.

Among the objects of my invention are: To provide an efficient walnut huller and washer; to provide a walnut huller having a floating brush; to provide a walnut huller which exerts a differential pressure on walnuts during the step of hulling; to provide a walnut huller which separates hulls from hulled nuts; to provide a walnut huller which will operate in proper manner even when trash, such as leaves, sticks, etc., are admixed with the unhulled nuts; to provide a means and method of preventing feed jams; to provide a walnut huller wherein the hulling brushes may be quickly removed or replaced; to provide a walnut huller which is adjustable for different sized nuts, and to provide a walnut huller which hulls and scrubs at the same time.

Other objects of my invention will be apparent or will be specifically pointed out in the description forming a part of this specification, but I do not limit myself to the embodiment of the invention herein described, as various forms may be adopted within the scope of the claim.

Referring to drawings:

Figure 1 is a side view of a preferred embodiment of my invention.

Figure 2 is a top plan view of the figure illustrated in Figure 1.

Figure 3 is a discharge end view of the machine.

Figure 4 is a detailed view of the washer drive partly in section and partly in elevation.

Figure 5 is a longitudinal view showing the brushes and draper in detail, and showing both hooked and inclined brush wires; and Figure 6 is a cross sectional view of the huller taken as indicated by the line 6—6 in Figure 1.

In hulling walnuts the raw material, i. e. the unhulled nuts, vary greatly in both size and condition. In the first place in an orchard run of unhulled nuts there are nuts whose hulls are not even cracked, there are other nuts whose hulls are partially cracked, and there are still other nuts which have lost all or most of their hull or may have a portion of the hull sticking so tightly to the shell that removal is difficult. These latter nuts are called "stick-tights", and it is one of the features of my machine that such nuts are, in the majority of cases, cleaned.

Furthermore in unhulled nuts there is a wide variation in size, even from the nuts on a given tree. There is, however, another factor that enters in,—namely, that nuts from one tree or of one particular variety will be considerably larger or smaller on the average than from other trees. It is, therefore, another feature of my invention that such changes in size may be rapidly accommodated by a quick change in the adjustment of the machine without stopping it.

In addition, walnut hulls are soft and in any feed chute there is always a tendency for nuts to jam. It is, therefore, desirable to incorporate in a machine means for preventing such jamming in the feed chute and I have done so in this case.

My machine also provides for immediate separation of the cleaned or partially cleaned nuts from the hulls,—the hulls being eliminated from the process line as fast as they become free. While I have described my device as a walnut huller, it is obvious that it is adapted to hull other nuts having similar hulling characteristics.

For the broader aspects of my invention I refer to a detailed and preferred embodiment of my invention as shown in the drawings. A frame 1 conveniently formed from angle and strap iron, supports at one end a feed chute 2 leading directly onto a draper table 3. The bottom of this draper table is formed from spaced round bars 4, the spacing between these bars being sufficient to allow most of the hulls to drop through but not sufficient to allow any good nuts to pass. A draper 5 in the form of an endless belt comprising a pair of drive belt members 6 and a plurality of lateral crossbars 7 supported on pulleys 9 and 10, the return being under the draper table. The crossbars 7 are also placed above the belt member 6 so that they ride slightly raised above the draper floor.

In a position immediately above the draper table is an inclined brush frame 11 holding three removable wire brushes 12, the entire brush assembly being supported on angular arms 14 pivoted at one end to the brush frame 11 and at the other end to the draper table. The rear pair of arms is preferably shorter than the front pair, thus placing the brush at an angle to the draper table floor. I prefer to incline these arms away from the feed chute so that relative motion of the brush assembly to or from the feed chute will raise and lower the brush assembly as related to draper 4. The minimum distance of the brush assembly is regulated by an adjustment link 15 connected at one end to the entrance end of the brush assembly and provided at the chute end with threads upon which a rotatable nut 16 is mounted bearing against frame 1, the rotation of this nut changing the distance between the brushes and the draper floor. The nut 16, however, is preferably not restrained as to outward movement and consequently the brush assembly may rise if sufficient pressure is exerted underneath the brush units. The operation of this brush is to be taken up later.

Nuts passing between the draper table and the brushes are dumped after hulling into a rotating washer 17, formed from longitudinal bars 18, held together by circular bars 19, the washer rotating on trunnions 20, bearing on two spaced circular bars.

The interior of the washer is preferably provided with spiral deflectors 21 in order that the nuts may be progressed therethrough during rotation, the nuts finally being dumped through a discharge chute 22 onto a conveyor table 23 and progressed therealong by a nut conveyor belt 24. It is customary to utilize this conveyor table as a culling table before the nuts pass to the dehydrator.

Immediately underneath the draper and washer in a longitudinal hull conveyor table 25 over which passes a hull disposal conveyor 26 supported on conveyor pulleys 27 which collects all hulls and trash which falls through the draper and washer and dumps it into a lateral hull disposal conveyor 28, which removes the hulls from the vicinity of the machine.

Power for the entire machine is supplied by a motor 30, which, if electricity be available is an electric motor, but, if not, a gasoline motor will suffice. This motor is placed on the very top of the machine in order that no water may reach it. A main drive belt 31 connects motor through a pinion gear and shaft 32, which, in turn, drives a main gear wheel 33. This gear wheel is mounted on a main shaft 34 upon which is also mounted draper pulley 10. The shaft is also extended outwardly to drive a hull conveyor belt 35 which drives the hull disposal conveyor 26, and through the medium of a transmission belt 36 power is transmitted to the nut conveyor belt 24 and in any convenient manner, such as gearing 37, to the hull disposal conveyor 28.

The main gear wheel 33 is provided with dogs 39 which engage longitudinal washer bars 18 to rotate the washer cage. I also prefer to provide the entire washer cage with a housing 40 and to provide wash water from a jet pipe extending into the interior of the cage, water being sprayed therefrom through a series of jets, not shown, under control of faucet 41.

In order that jams in the feed may be prevented, I prefer to direct nuts from the feed chute into the draper by an inclined movable flap 44 which is moved by contact with crossbars 7 each time one comes around onto the draper floor. Such a movement jolts the nuts in the feed chute, causing them to progress without jamming, onto the draper.

Returning to the operation of the device, the operator preferably stands at the feed end and watches the nuts going into the feed chute 2, and is quickly able to judge by looking at the nuts what the proper adjustment of the brush assembly above the draper floor should be, and by turning nut 16 the adjustment desired is accomplished. He may also watch the nuts discharge from under the brush to see whether or not the hull removal is complete.

Referring directly to Figures 5 and 6, it will be seen that I prefer to use either hooked brush wires with the ends of the wires bent toward the oncoming nuts or wires inclined as a whole. The brush wires 45, are, of course, of relatively heavy and springy wire and enter the hull and tear it, thereafter brushing the pieces away from the nut.

I prefer to adjust the angle of the brush assembly so that the brush wires just contact the hull of an average nut at the entrance end, and the entrance to the brush assembly is easy, no great amount of power being necessarily applied at this point. I prefer to adjust the brush assembly, however, so that at the far end the brush wires are spaced above the draper floor somewhat less than the diameter of the average clean nut. In the majority of cases the hull is entirely removed from the nut before the nut has progressed the full length of the brush and the final brush wires bear heavily and directly on the shell and serve to remove any "stick-tight" portion which may be remaining upon it. It is not claimed that this brush assembly will remove any and all portions of the hull stuck to the shell but the machine will remove in most cases such portions, particularly if they are green and soft. All loose portions of sunburned hulls are removed. Thus pressure is progressively increased during transversal of the brush.

In case a smaller average sized nut is being fed to the machine the operator, by means of nut 16 may lower the entire brush assembly, the arm arrangement being so that substantially the same angularity with the draper floor is maintained. Furthermore, if it should happen that a rock, or other large object, should pass through the machine the entire brush assembly may rise under the urge which would be imparted thereto by the larger object. Furthermore, if large nuts come through mixed with a main body of smaller ones the brush assembly will quickly adjust itself for the larger average size. It is only necessary to adjust the brush for minimum sizes, the maximum sizes being taken care of by the floating of the brushes, and in some cases, where feed is continuous, it may be desirable to let the brush float entirely on the nuts.

As brush wires are bound to be bent or otherwise disrupted during continued operation of the device, I find that it is desirable to make the brushes demountable. I accomplish this by making each of the three brushes in the form of a brush base 45' on which the wires are mounted, these brush bases having a shoulder 46 bearing against brush frame 11 and being held against the frame by locking bars 47, held down by locking bolts and nuts 48. Thus, any or all of the brushes 12 may be quickly removed, repaired, and replaced, or new brushes installed.

One of the features of my device is that hulls are rapidly removed from the huller. The floor of the draper table, being formed from spaced round bars 4, allows the broken pieces of hull to fall therethrough as the nuts revolve, and in case any of the hulls should pass through the hulling portion of the machine into the washer, such pieces will in most cases be eliminated through the washer bars 18. It is very rare that any hulls pass through the washer with the nuts. All hulls and trash falling through the floor of the draper table or through the washer will fall on the hull disposal conveyor and be removed from the vicinity of the machine.

Furthermore, I have found that trash in general and leaves in particular do not prevent the hulls being removed from the nuts. In many of the present commercial walnut hullers, the presence of any substantial amount of leaves prevents the proper hulling of the nuts. In my machine, however, the brush wires penetrate the leaves easily, passing through them into the hull without material obstruction. My machine is able to hull with perfect satisfaction even though the entering unhulled nuts have a substantial admixture of trash. The rotation of the nuts keeps the brush clean and the torn-up leaves are eliminated along with the hulls. Furthermore, I find that hulls in my machine are broken up into relatively fine particles due to multiple rotations of the nut while under the brushes.

It will also be seen that the walnut huller above described is relatively free from one big disadvantage of many prior hullers, i. e. shell breakage. In many prior machines there is a large percentage of such broken nuts, particularly in those machines that are not able to compensate for large and small nuts passing through the machine at the same time. Under these circumstances the large nuts are invariably broken.

The wires of the brush used in my present invention, while they penetrate the hulls easily, are sufficiently resilient to prevent them from entering or piercing the shell of the nut, and the ability of the brush assembly as a whole to rise prevents shell crackage when a majority of large nuts are fed into the machine.

I claim:

In a walnut huller, the combination of a flat wire brush and a stationary support, said brush being positioned over said support with the wires thereof directed toward said support, said wires being sufficiently pointed and rigid to penetrate the hulls of walnuts to be hulled, and said brush having insufficient weight to cause said wires to penetrate the shells of said walnuts, a plurality of pivoted arms connecting said brush and said support, said arms being inclined in a common direction away from the entrance end of said combination, whereby said brush may float upwardly on the nuts passing thereunder, means for maintaining a minimum distance between said brush and said support without interfering with the upward motion of said brush, said arms being of different length along the course of said brush to create an angle between the plane of the brush and the plane of said support, and means for rolling unhulled walnuts between said brush and said support at the point of greatest divergence.

WILLIAM E. FORMWAY.